US012264498B2

(12) United States Patent
Ben-Aharon et al.

(10) Patent No.: US 12,264,498 B2
(45) Date of Patent: Apr. 1, 2025

(54) ROTATABLE MAGNETIC KEY COMBINATION ELEMENT

(71) Applicant: Mul-T-Lock Technologies Ltd., Yavne (IL)

(72) Inventors: Effi Ben-Aharon, Hod HaSharon (IL); Asaf Bortman, Yavne (IL)

(73) Assignee: Mul-T-Lock Technologies Ltd., Yavne (IL)

( * ) Notice: Subject to any disclaimer, the term of this patent is extended or adjusted under 35 U.S.C. 154(b) by 374 days.

(21) Appl. No.: 17/607,036

(22) PCT Filed: Apr. 19, 2020

(86) PCT No.: PCT/IL2020/050457

§ 371 (c)(1),
(2) Date: Oct. 28, 2021

(87) PCT Pub. No.: WO2020/222224

PCT Pub. Date: Nov. 5, 2020

(65) Prior Publication Data

US 2022/0205276 A1 Jun. 30, 2022

(30) Foreign Application Priority Data

Apr. 28, 2019 (IL) .......................................... 266258

(51) Int. Cl.

| | |
|---|---|
| ***E05B 19/00*** | (2006.01) |
| ***E05B 27/00*** | (2006.01) |
| ***E05B 35/00*** | (2006.01) |
| ***E05B 47/00*** | (2006.01) |

(52) U.S. Cl.

CPC ...... *E05B 19/0058* (2013.01); *E05B 27/0007* (2013.01); *E05B 35/003* (2013.01); *E05B 47/0045* (2013.01)

(58) Field of Classification Search

CPC ............. E05B 19/0058; E05B 27/0007; E05B 35/003; E05B 47/0045; F16B 41/00

See application file for complete search history.

(56) References Cited

U.S. PATENT DOCUMENTS

| | | | | |
|---|---|---|---|---|
| 5,622,067 | A | 4/1997 | Waitz | |
| 9,528,297 | B2 | 12/2016 | Gentile | |
| 9,540,847 | B2 * | 1/2017 | Pena | E05B 63/0017 |

FOREIGN PATENT DOCUMENTS

| | | |
|---|---|---|
| DE | 2727126 | 12/1978 |
| EP | 0665351 | 8/1995 |
| GB | 2072742 | 10/1981 |
| JP | 56-025582 | 3/1981 |
| JP | 63-005163 | 1/1988 |
| WO | 03054330 | 7/2003 |
| WO | 2011/109081 | 9/2011 |

OTHER PUBLICATIONS

PCT Search Report and Written Opinion PCT/IL2020/050457, Aug. 24, 2020.

* cited by examiner

*Primary Examiner* — Michael P Ferguson
*Assistant Examiner* — Thomas L Neubauer
(74) *Attorney, Agent, or Firm* — Dekel Patent Ltd.; David Klein

(57) ABSTRACT

A key device (10) includes a generally elongate shaft portion (12), and at least one magnetic key combination element (20) disposed in the shaft portion (12), which is rotatable about a rotation axis (22).

11 Claims, 2 Drawing Sheets

ROTATABLE MAGNETIC KEY COMBINATION ELEMENT

FIELD OF THE INVENTION

The present invention relates to keys and locking apparatus generally, and more particularly to a key with a rotatable magnetic key combination element.

BACKGROUND OF THE INVENTION

There are many magnetically actuated locks in the prior art. In general, the key that is used to actuate the lock has fixed magnets on the key blade or key shaft. These fixed magnets cooperate with magnetic elements located in the lock to bring the magnetic elements to a shear line, which is the unlocked position. For example, in prior art magnetic cylinder locks, the magnetic elements in the key are fixed whereas the magnetic elements in the plug of the cylinder lock are movable.

SUMMARY OF THE INVENTION

The present invention seeks to provide a novel key device with a rotatable magnetic key combination element, as described in detail below. Unlike the prior art, the magnetic key combination element of the key can rotate, whereas the magnetic elements in the plug of the cylinder lock do not rotate.

There is thus provided in accordance with a non-limiting embodiment of the present invention a key device including a generally elongate shaft portion, and at least one magnetic key combination element disposed in the shaft portion which is rotatable about a rotation axis.

In accordance with a non-limiting embodiment of the present invention a magnetization direction of the at least one magnetic key combination element is not collinear with the rotation axis (e.g., it is perpendicular or parallel to the rotation axis).

In accordance with a non-limiting embodiment of the present invention the at least one magnetic key combination element includes a diametral magnetic key combination element which has north-polarity and south-polarity magnetic portions. The rotation axis may be perpendicular to, coplanar with or parallel to, the elongate shaft portion.

The at least one magnetic key combination element may or may not be movable linearly along the rotational axis.

The at least one magnetic key combination element can protrude from at least one side of the key device.

There is thus provided in accordance with a non-limiting embodiment of the present invention lock and key combination including a key device including a generally elongate shaft portion, and at least one magnetic key combination element disposed in the shaft portion, which is rotatable about a rotation axis, and a cylinder lock including a cylinder lock housing in which a plug is mounted for rotation along a shear line, the plug including a keyway and being operatively coupled to a cam, wherein the plug includes at least one magnetic plug element, and wherein after insertion of the key device into the keyway, the at least one magnetic key combination element rotates and aligns with the at least one magnetic plug element such that the at least one magnetic key combination element magnetically interacts with the at least one magnetic plug element against a force of a biasing device and brings the at least one magnetic plug element to the shear line.

In accordance with a non-limiting embodiment of the present invention the at least one magnetic plug element does not enter the keyway.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
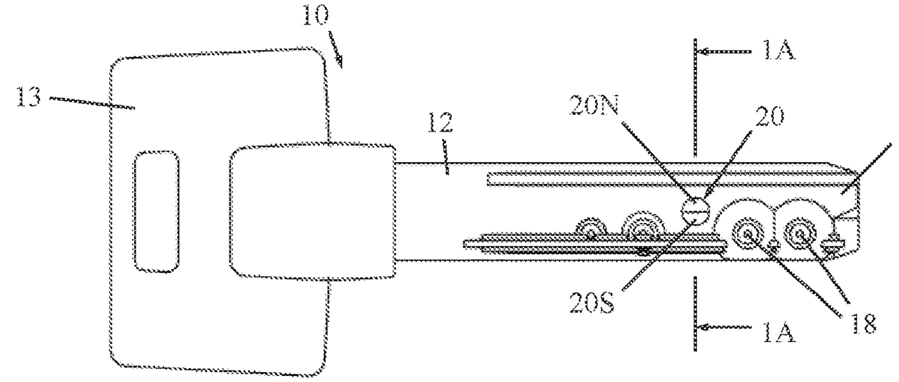
FIG. 1 is a simplified planar illustration of a key device with a rotatable magnetic key combination element, constructed and operative in accordance with a non-limiting embodiment of the present invention.
Figure 1A:
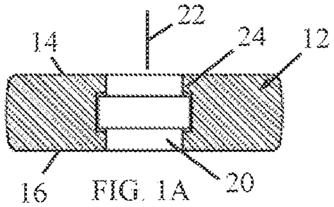
FIGS. 1A-1C are simplified sectional illustrations of the rotatable magnetic key combination element of FIG. 1, taken along lines 1A-1A in FIG. 1.

Reference is now made to FIGS. 1 and 1A, which illustrate a key device 10, constructed and operative in accordance with a non-limiting embodiment of the present invention. The term "key device" encompasses both a key blank (with no key cuts formed thereon) and a key with key cuts formed thereon.

Key device 10 may include a generally elongate shaft portion 12, head 13 and may or may not include first and second oppositely directed key combination surfaces 14 and 16 (FIG. 1A). Key device 10 can be provided as a key blank with no or substantially no key cuts formed thereon (the key cuts being formed later by a locksmith and the like). Alternatively, key device 10 may be include a row of key cuts 18 which define a key combination formed along the first key combination surface 14 and/or along the second key combination surface 16. Accordingly, key device 10 may define a reversible key, with symmetric key combination surfaces 14 and 16. Alternatively, key device 10 may have a single key combination surface or different key combination surfaces.

At least one magnetic key combination element 20 is disposed in shaft portion 12 and element 20 is rotatable about a rotation axis 22 (FIG. 1A). In one embodiment, magnetic key combination element 20 can have any magnetization direction (magnetization direction refers to the direction between the north and south pole of a magnet), and the magnetization direction can be oriented in any orientation with respect to the rotation axis 22. In a preferred embodiment, the magnetization direction of magnetic key combination element 20 is not collinear with rotation axis 22, but rather, for example, is perpendicular to rotation axis 22. For example, magnetic key combination element 20 may be a diametral magnet that has north-polarity and south-polarity magnetic portions 20N and 20S. Other possibilities include, but are not limited to, the magnetization direction of element 20 being parallel to rotation axis 22.

The magnetic key combination element can have more than one north-polarity portion 20N and more than one south-polarity magnetic portion 20S.

The magnetic key combination element 20 may be a one-piece magnet or may comprise several discrete magnets that rotate together about the rotation axis 22.

The magnetic key combination element 20 may be made of any suitable magnetic material, such as but not limited to, rare-earth materials, e.g., neodymium iron boron or samarium cobalt and the like, or non-rare-earth materials, e.g., different ferrous alloys.

In the illustrated embodiment of FIGS. 1 and 1A, rotation axis 22 is perpendicular to first key combination surface 14 and second key combination surface 16.

Figure 4:
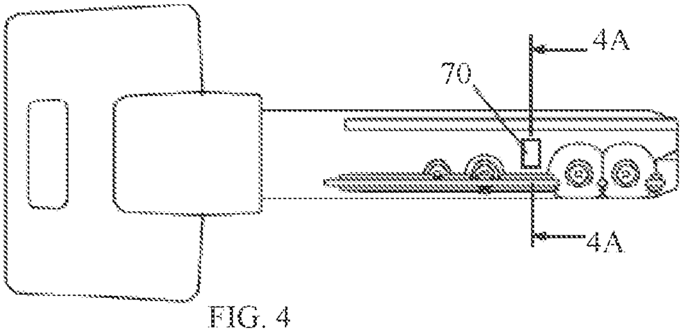
FIG. 4 is a simplified planar illustration of a key device with a rotatable magnetic key combination element, constructed and operative in accordance with another non-limiting embodiment of the present invention.
Figure 4A:
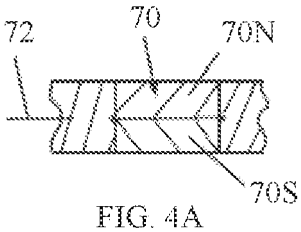
FIG. 4A is a simplified sectional illustration of the rotatable magnetic key combination element of FIG. 4, taken along lines 4A-4A in FIG. 4.

Alternatively, in the illustrated embodiment of FIGS. 4 and 4A, a magnetic key combination element 70 is rotatable about a rotation axis 72 (FIG. 4A), which is coplanar with or parallel to first key combination surface 14 and second key combination surface 16. Similarly to the embodiment of FIGS. 1 and 1A, in the embodiment of FIGS. 4 and 4A, magnetic key combination element 70 may have at least one pair of north-polarity and south-polarity magnetic portions 70N and 70S. Other rotational directions and configurations of the magnetic key combination element are also contemplated in the scope of the invention. For example, the magnetic key combination element can be a sphere which rotates (e.g., rolls or wobbles) in a recess or socket in the shaft portion of the key device. The rotation of the sphere is always about some rotation axis; the rotation axis can be arbitrary and change depending on the orientation of the sphere as it rotates or wobbles.

Figure 2A:
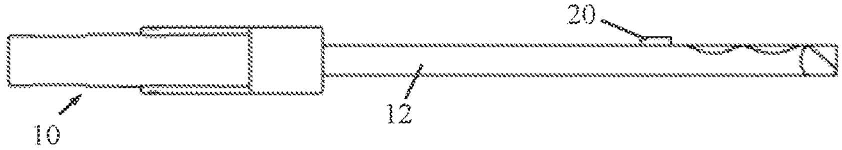
FIGS. 2A-2C are simplified side edge views of the key device, in which the magnetic key combination element can protrude from one side of the key device (FIG. 2A), or in which the magnetic key combination element can protrude from both sides of the key device or in which there are two such magnetic key combination elements and each one can protrude from one side of the key device (FIG. 2B), or in which the magnetic key combination element can be flush or below the key combination surfaces of the key device (FIG. 2C)

Referring again to FIG. 1A, it is seen that magnetic key combination element 20 may be maintained in shaft portion 12 by one or more collars or shoulders 24. In such a case, magnetic key combination element 20 is not movable or barely movable linearly along rotational axis 22, and as seen in FIG. 2C, magnetic key combination element 20 is flush or below the key combination surfaces of the key device 10. In such an embodiment, magnetic key combination element 20 remains flush or below the key combination surfaces of the key device 10 even after insertion and operation of the key device in a cylinder lock.

Figure 1B:
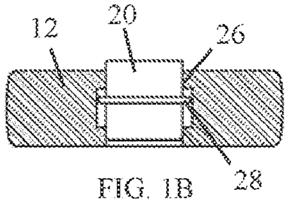

Alternatively, as seen in FIG. 1B, magnetic key combination element 20 may be maintained in shaft portion 12 by one or more shoulders 26. The magnetic key combination element 20 may have an annular ridge 28 that can abut against the one or more shoulders 26. (Alternatively, the ridge can be a radial ridge in the hole of the shaft and the shoulder can be formed on element 20.) In this manner, magnetic key combination element 20 is movable linearly along rotational axis 22. Magnetic key combination element 20 can thus protrude from one side of the key device 10 (FIG. 2A), or from both sides of the key device 10 (FIG. 2B).

Figure 1C:
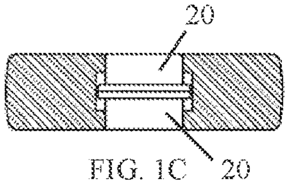
Figure 2B:
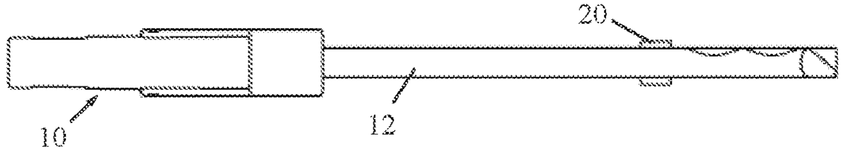
Figure 2C:
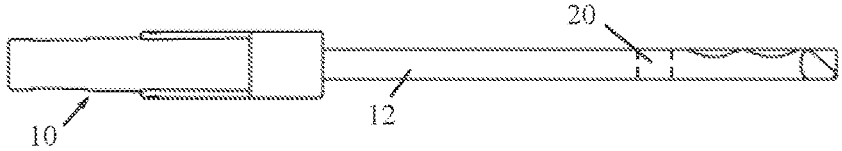

Alternatively, as seen in FIG. 1C, two coaxial magnetic key combination elements 20 may be in the key device and each one can protrude from one side of the key device (FIG. 2B).

Figure 3A:
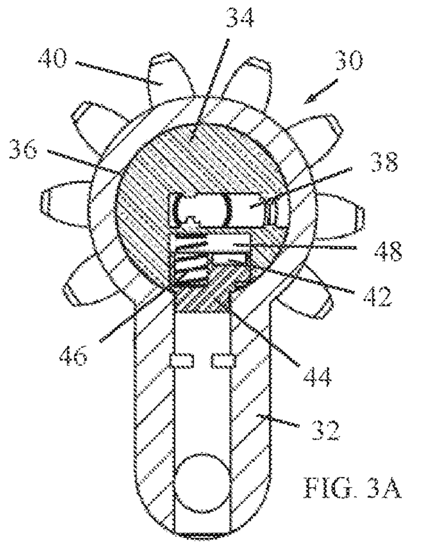
FIGS. 3A and 3B are sectional illustrations respectively before and after insertion of the key device of FIG. 1 into a cylinder lock, wherein in FIG. 3B the key device moves a magnetic plug element in the plug of the cylinder lock to an unlocked position in which the magnetic plug element is at the shear line.

Reference is now made to FIG. 3A, which illustrates a cylinder lock 30 for use with the key device 10. Cylinder lock 30 includes a cylinder lock housing 32 in which a plug 34 is mounted for rotation along a shear line 36. Plug 34 includes a keyway 38 and is operatively coupled to a cam 40 for bringing locking members (not shown) into locked or unlocked positions.

Plug 34 includes plug pins (not shown) that cooperate with driver pins (not shown) in the cylinder lock housing 32; the plug pins and driver pins are move to the shear line 36 upon insertion of a properly coded key, as is well known in the art.

In accordance with a non-limiting embodiment of the present invention, the plug 34 includes a magnetic plug element 42. The magnetization direction of plug element 42 may be chosen to correspond with the magnetization direction of magnetic key combination element 20 of FIG. 1. Thus, for example, if magnetic key combination element 20 is a diametral magnet, then plug element 42 may also be a diametral magnet. Plug element 42 includes a body 44 which is nominally urged to cross the shear line 36 by a biasing device 46, such as a coil spring. It is noted that magnetic plug element 42 does not enter keyway 38, unlike conventional plug pins, but instead is mounted in a recess 48 formed in plug 34. The biasing device 46 presses against one of the inner surfaces of recess 48. Magnetic plug element 42 may be mechanically inaccessible from keyway 38 (meaning a tool cannot be used to touch magnetic plug element 42), although it magnetically interacts (by attraction or repulsion) with magnetic key combination element 20 so that plug element 42 is brought to the shear line.

Figure 3B:
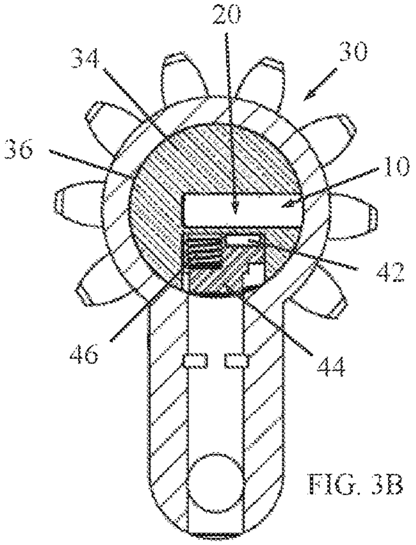

FIG. 3B illustrates cylinder lock 30 after insertion therein of key device 10 (into the keyway). The magnetic key combination element 20 rotates and aligns with magnetic plug element 42 such that magnetic key combination element 20 magnetically interacts (attracts or repels) magnetic plug element 42 against the force of biasing device 46 (which compresses, stretches, twists or otherwise reacts due to the magnetic interactive force) and brings magnetic plug element 42 to the shear line 36, thereby enabling turning plug 34 to operate the cylinder lock 30.

The magnetic rotational alignment of rotatable magnetic key combination element 20 with magnetic plug element 42 is now explained with reference to FIGS. 5A and 5B.

Figure 5A:
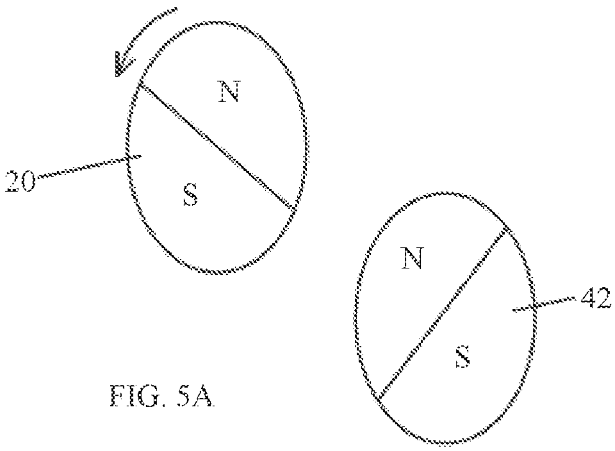
FIGS. 5A and 5B are simplified illustrations of the rotatable magnetic key combination element, respectively, before and after rotational alignment with a magnetic plug element in the plug of the cylinder lock.
Figure 5B:
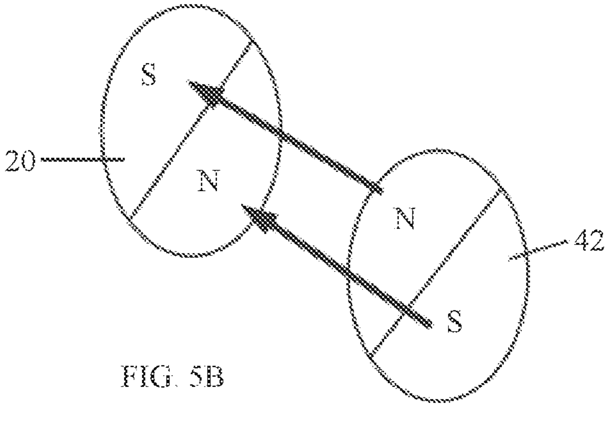

Initially, as seen in FIG. 5A, the north pole of element 20 may be partially aligned with the north pole of plug element 42 and the south pole of element 20 may be partially aligned with the south pole of plug element 42. The partial alignment of like poles creates a combination of an attractive force and a repulsive force that turns element 20 so that the south pole of element 20 is fully aligned with the north pole of plug element 42 and the north pole of element 20 is fully aligned with the south pole of plug element 42, as seen in FIG. 5B. The full alignment of opposite poles creates an attractive force that moves plug element 42 to the shear line as seen in FIG. 3B.

If an unauthorized key without a rotatable magnetic key combination element had been used, that unauthorized magnetic element would remain in the position of FIG. 5A and would not create the attractive force required to move plug element 42 to the shear line.

What is claimed is:

1. A key device comprising:

a generally elongate shaft portion; and at least one magnetic key combination element disposed in said elongate shaft portion and rotatable with respect to said elongate shaft portion about a rotation axis, wherein said at least one magnetic key combination element has an operative mode in which it rotates with respect to said elongate shaft portion and aligns with a magnetic plug element such that said at least one magnetic key combination element magnetically interacts with said magnetic plug element and brings said magnetic plug element to a shear line of a cylinder lock and wherein said rotation axis is not parallel to said elongate shaft portion.

2. The key device according to claim 1, wherein a magnetization direction of said at least one magnetic key combination element is not collinear with said rotation axis.

3. The key device according to claim 1, wherein a magnetization direction of said at least one magnetic key combination element is perpendicular to said rotation axis.

4. The key device according to claim 1, wherein said at least one magnetic key combination element comprises at least one diametral magnetic key combination element which has north-polarity and south-polarity magnetic portions.

5. The key device according to claim 1, wherein said rotation axis is coplanar with said elongate shaft portion.

6. The key device according to claim 1, wherein said rotation axis is parallel to said elongate shaft portion.

7. The key device according to claim 1, wherein said at least one magnetic key combination element is not movable linearly along said rotational axis.

8. The key device according to claim 1, wherein said at least one magnetic key combination element is movable linearly along said rotational axis.

9. The key device according to claim 1, wherein said at least one magnetic key combination element is protrudable from at least one side of said key device.

10. A lock and key combination comprising:

a key device comprising a generally elongate shaft portion, and at least one magnetic key combination element disposed in said elongate shaft portion and rotatable with respect to said elongate shaft portion about a rotation axis; and a cylinder lock comprising a cylinder lock housing in which a plug is mounted for rotation along a shear line, said plug comprising a keyway and being operatively coupled to a cam;

wherein said plug comprises at least one magnetic plug element, and wherein after insertion of said key device into said keyway, said at least one magnetic key combination element rotates with respect to said elongate shaft portion and aligns with said at least one magnetic plug element such that said at least one magnetic key combination element magnetically interacts with said at least one magnetic plug element against a force of a biasing device and brings said at least one magnetic plug element to said shear line.

11. The lock and key combination according to claim 10, wherein said at least one magnetic plug element does not enter said keyway.

* * * * *